United States Patent [19]
Jain et al.

[11] Patent Number: 5,511,518
[45] Date of Patent: Apr. 30, 1996

[54] SEALING ASSEMBLY WITH UNDERCUT GROOVE

[75] Inventors: Balbir Jain, Northbrook; Josefino T. Inciong, Skokie, both of Ill.

[73] Assignee: Fel-Pro Incorporated, Skokie, Ill.

[21] Appl. No.: 337,648

[22] Filed: Nov. 2, 1994

[51] Int. Cl.$^6$ .............................. F01M 9/10; F16J 10/00
[52] U.S. Cl. .................... 123/90.37; 123/90.38; 123/195 C; 123/198 E; 277/27; 277/235 B
[58] Field of Search ................ 123/90.33, 90.37, 123/90.38, 195 C, 196 R, 196 M, 198 E; 277/27, 235 B, 165, 184

[56] References Cited

U.S. PATENT DOCUMENTS

| 2,770,510 | 11/1956 | Collins | 309/4 |
| 3,063,439 | 11/1962 | Kessel | 123/90.38 |
| 3,372,941 | 3/1968 | Liebig | 123/90.37 |
| 3,909,017 | 9/1975 | Engström | 277/168 |
| 4,113,268 | 9/1978 | Simmons et al. | 277/168 |
| 4,192,520 | 3/1980 | Hasegawa | 277/235 B |
| 4,256,314 | 3/1981 | Berglund et al. | 277/27 |
| 4,597,583 | 7/1986 | Inciong et al. | 277/235 B |
| 4,687,127 | 8/1987 | Pardo et al. | 277/12 |
| 4,848,806 | 7/1989 | Miller | 277/27 |
| 5,255,647 | 10/1993 | Kiczek | 123/195 C |
| 5,367,993 | 11/1994 | Tulach et al. | 123/90.37 |
| 5,375,569 | 12/1994 | Santella | 123/90.38 |

FOREIGN PATENT DOCUMENTS

| 547306 | 6/1993 | European Pat. Off. | 123/195 C |
| 1035878 | 9/1953 | France | 123/90.38 |
| 3036700 | 5/1982 | Germany | 277/27 |

*Primary Examiner*—Weilun Lo
*Attorney, Agent, or Firm*—Laff, Whitesel, Conte & Saret, Ltd.

[57] ABSTRACT

A sealing assembly for use with an internal combustion engine includes a gasket of elastomeric material inserted within a groove formed in the surface of an engine part. The gasket has an anchoring portion which fits within the groove and a sealing portion extending outside of said groove. The bottom, side and top walls of the groove form a retaining portion which is at least 5% larger than the anchoring portion of the gasket at the time of assembly. The anchoring portion may expand and fill the retaining portion of the groove upon exposure to the engine fluids. At least one top wall of the retaining portion of the groove opposes a shoulder of the anchoring portion of the gasket at an interior angle of not more than about ninety degrees.

12 Claims, 2 Drawing Sheets

FIG. 1 PRIOR ART
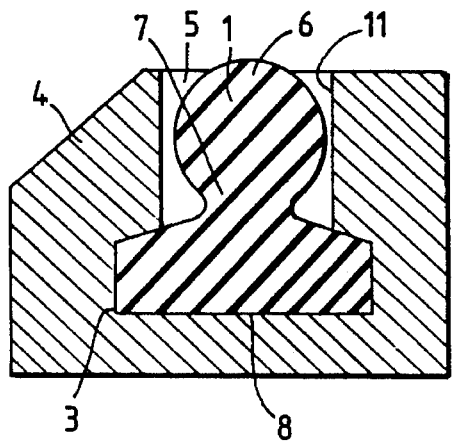
FIG. 2 PRIOR ART
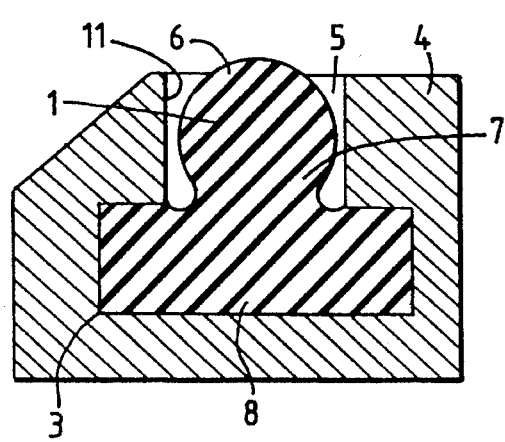
FIG. 3C
FIG. 3D
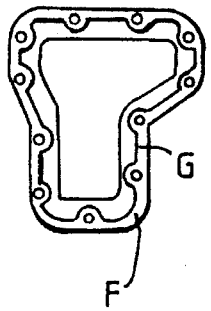
FIG. 3A
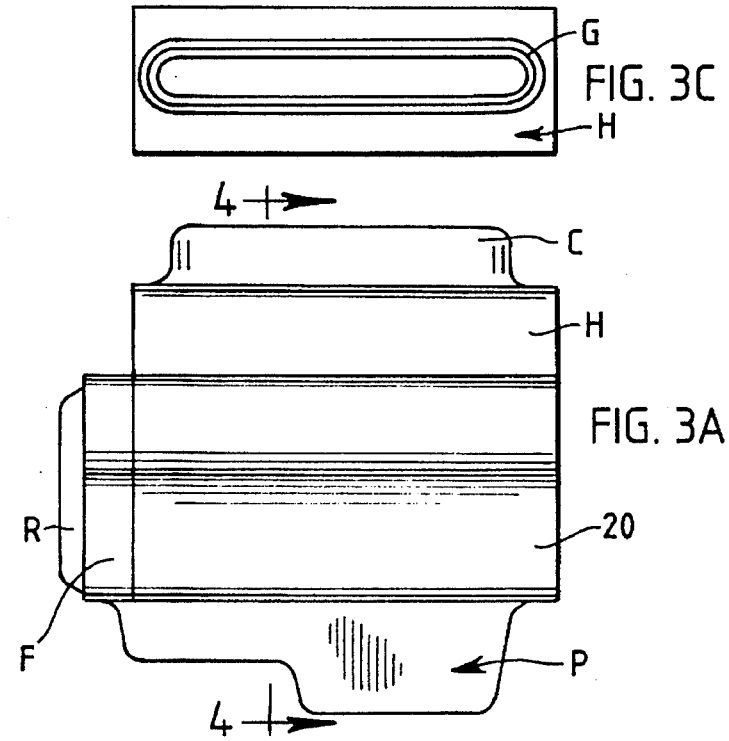
FIG. 3B
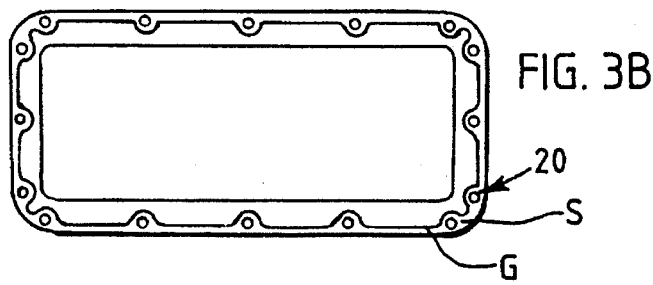

5,511,518

SEALING ASSEMBLY WITH UNDERCUT GROOVE

This invention relates to sealing assemblies and more particularly, to sealing assemblies for use with internal combustion engines.

Various components of internal combustion engines require gaskets for proper sealing against leakage of fluids, such as motor oil or coolant. The head, block, front housing, oil pan, rocker cover, manifold, and oil filter adapter are all exemplary components which require sealing against fluid leakage.

Prior sealing assemblies suggested for some of these applications involved providing a groove in one of the engine parts, such as in an appropriate metal engine part, and then inserting an engineered molded gasket, such as one made of silicone rubber or another suitable elastomeric material, into the groove. Such gaskets accommodate the sometimes uneven but closely adjoining parts, while sealing against leakage. Gaskets of that type are often dimensioned so that a portion thereof conforms in shape to, and is frictionally engaged and retained by, the walls of the groove, i.e., the volume of the anchoring portion of the gasket to be disposed within the groove is selected to be substantially equal to the volume of the groove so that there is a snug fit between them. The sealing portion of such a gasket typically extends outside of the groove so that the gasket can perform its sealing function against the adjoining part. Therefore, the configuration of the portion of the gasket within the groove is usually different from the configuration of the sealing portion of the gasket which extends outside of the groove. It is the volume of the anchoring portion of the gasket seated within the retaining groove which, traditionally, is selected to be substantially equal to the volume of the retaining portion of the groove.

The initial assembly of such gaskets with a mating groove is difficult and sometimes incomplete, particularly for gaskets which are limp, expansive and narrow. Further, despite careful molding of such gaskets and machining of such grooves, these sealing assemblies sometimes fail. Failure results from the improper assembly and from a disengagement of the gasket from a groove, such as due to insufficient retention of the gasket relative to the groove, which leads to fluid leakage and damage to an engine through excessive wear or decreased engine performance. Then, because such sealing assemblies are often not easily accessible to a mechanic, the labor cost in disassembling such an assembly to re-insert a gasket into a groove can be very great.

Therefore, it is an object of the invention to provide a sealing assembly which is more reliable than prior sealing assemblies employing expansive gasket elements. In particular, it is an object of the invention to provide a sealing assembly in which the gasket member remains firmly engaged and retained within a groove formed in the assembly over extended time periods and despite exposure to engine fluids, while retaining the desired sealing function.

SUMMARY OF THE INVENTION

A sealing assembly according to the present invention comprises an elastomeric gasket having an anchoring portion of selected volume. There are at least one and preferably two shoulders along the upper part of the anchoring portion. The anchoring portion is seated in a groove formed in an appropriate engine component. The groove includes walls which define a retaining portion between them in which the anchoring portion of the gasket is seated. One and preferably two of the groove walls oppose and extend over the gasket shoulders to help retain the gasket within the groove. The volume of the retaining portion of the groove is larger than the volume of the anchoring portion at the time of the assembly, so that when the anchoring portion expands upon exposure to engine fluids, the anchoring portion fits snugly within the retaining portion and is frictionally retained therein.

Further objects, features and advantages of the invention will become apparent from the following descriptions and drawings.

BRIEF DESCRIPTION OF THE DRAWINGS

FIG. 1 is a cross sectional view of a sealing assembly of the prior art.

FIG. 2 is a cross sectional view of another sealing assembly of the prior art.

FIG. 3A is a side elevational view of a typical internal combustion engine assembly having engine parts that are sealable in accordance with this invention;

FIGS. 3B, 3C, and 3D are bottom, top and front plan views, respectively, of engine parts of the engine assembly of FIG. 3A.

DETAILED DESCRIPTION

Figure 4:
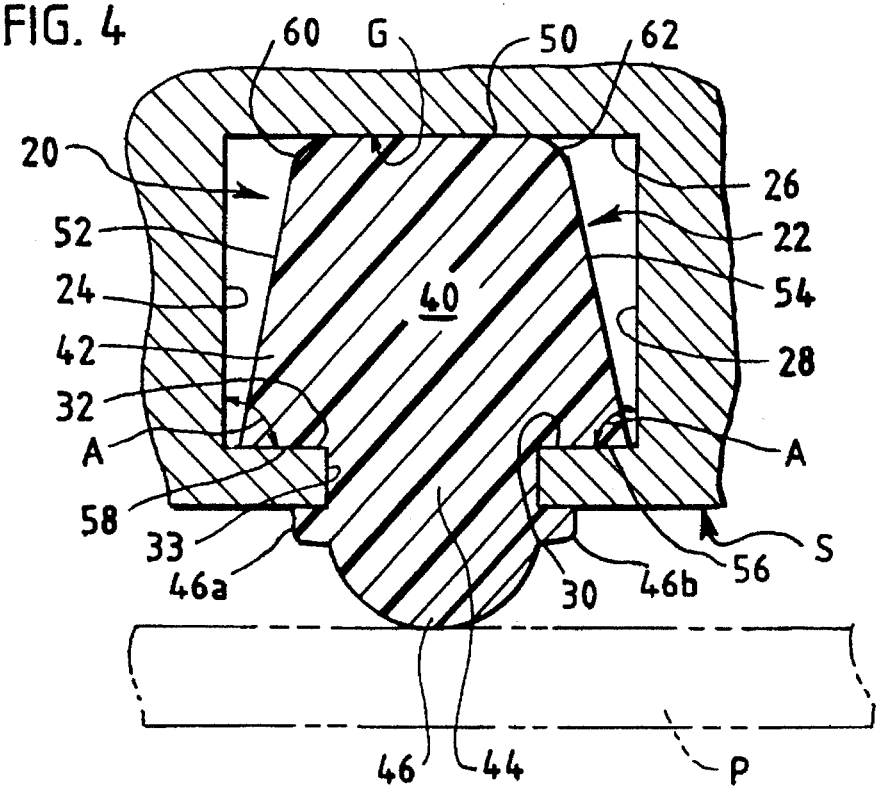
FIG. 4 is a cross-sectional view taken along line 4—4 of FIG. 3A.

Referring now to the drawings, FIGS. 1 and 2 show cross-sectional views of prior art sealing assemblies of the type shown in U.S. Pat. No. 3,909,017. In those assemblies, the base portions 8 of a rubber sealing ring 1 completely fill the lower retaining portions 3 of grooves 5 formed in members 4. The necks 7 and outer sealing portions 6 of the rubber sealing rings 1 extend outwardly of the lower retaining portions 3 of grooves 5 through a gap defined by the upper groove walls 11 to the exterior. The base portions 8 completely fill the retaining portions 3 of grooves 5.

Referring now to FIGS. 3A, 3B, 3C, 3D and 4, the surfaces S of engine parts or components are provided with a formed or machined undercut groove G of a desired configuration. As seen in FIG. 3A, an engine assembly may comprise a metal engine block 20 associated with a cylinder head H and a front housing F. The base of the engine block may be provided with an oil pan P bolted thereto. The head H may be surrounded by a rocker cover C and the front housing may be sealed with a front cover R. FIG. 3B shows the undercut groove G in block 20 in which a gasket may be positioned to confront and seal against the flange of oil pan P. Similarly, FIGS. 3C and 3D show undercut grooves G in cylinder head H and front housing F in which gaskets may be positioned to confront and seal against the flanges of rocker cover C and front cover R, respectively.

In the embodiment shown, a retaining portion 22 of the groove G is formed by side wall 24, bottom wall 26, side wall 28, and top wall portions 30 and 32. Side walls 24 and 28 form the sides of the retaining portion 22, bottom wall 26 forms the bottom of the retaining portion 22, and retention shoulders or top wall portions 30, 32 form the top of the retaining portion 22. Retaining portion 22 is open at the top because the inner edges of top wall portions 30, 32 are spaced from each other to allow gasket 40 to protrude outwardly therebetween and through reduced channel 33, as described subsequently. The cross-sectional shape of retaining portion 22 can be other than the generally rectangular shape shown in FIG. 4, depending on the gasket shape and environment or application in which the sealing assembly is to be used. But it is important that the interior angle A between walls 28 and 30 and between walls 24 and 32 be at most 90 degrees. Also, interior corners 60, 62 maybe curved for easier insertion into retaining portion 22.

A limp, thin, expansive elastomeric gasket 40 may be molded, as by injection molding, and includes an anchoring portion 42, a neck portion 44, and a head or sealing portion 46. Anchoring portion 42 is retained entirely within retaining portion 22 and includes a bottom 50, sides 52, 54, and upper shoulders 56, 58. Sides 52, 54 are inclined inwardly from top to bottom for ease of insertion through the channel 33 and into the retaining portion 22. Bottom 50 extends along bottom wall 26 of groove G. Shoulders 56, 58 define the uppermost surface of the anchoring portion 42 and oppose and extend parallel to wall portions 30, 32 to be restrained against removal thereby.

It has been found that many elastomeric gasket or bead materials, such as silicone rubber, tend to expand or swell when exposed to engine fluids such as coolant, oil and fuel. In traditional sealing assemblies, therefore, expansion of the beads causes them to split the gasket and break the groove wall and leads to engine damage or reduced performance. Consequently, in accordance with the present invention, the volume of the anchoring portion 42, when it is initially press-fit into retaining portion 22, i.e., before the sealing assembly is exposed to engine fluids, is designed to be less than the volume of retaining portion 22.

The neck portion 44 of gasket 40 extends outwardly from anchoring portion 42 and between the spaced walls 30, 32 and into reduced channel 33, terminating in sealing portion 46. Reduced channel 33 opens at surface S and provides an entryway for insertion of the gasket into the retaining portion 22 of the groove G. Sealing portion 46 extends beyond reduced channel 33 and is positioned to seal against a confronting flange, such as the flange of oil pan P, and may include a pair of lips 46a, 46b which extend laterally beyond neck 44. Consequently, lips 46a, 46b also extend laterally beyond the reduced channel 33 along surface S and thereby help secure gasket 40 within retaining portion 22.

It has been found that the volume of the retaining portion 22 along the length of the gasket should be at least 5%, and preferably at least 10%, greater than the volume of the anchoring portion 42 of the gasket 40 when installed and before it is exposed to engine fluid. The retaining portion 22 should not be so large that the anchoring portion fails to generally snugly fill the retaining portion 22 once the gasket is exposed to engine fluid.

Figure 5:
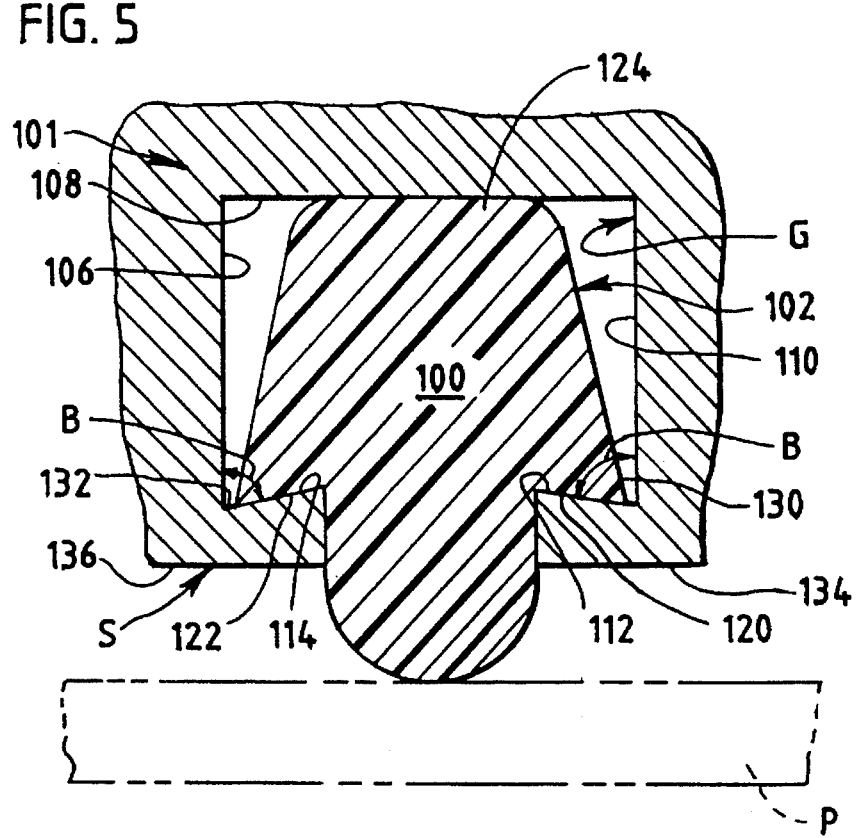
FIG. 5 is a cross-sectional view like that of FIG. 4 of a second embodiment of the invention.

FIG. 5 shows a second embodiment of the invention. There, another gasket 100 is secured to an engine part 101 and an anchoring portion of gasket 100 is retained within a retaining portion 102 of a groove G. Retaining portion 102 is defined by side walls 106, 110, bottom wall 108, and top walls 112, 114. The cross-sectional shape of the retaining portion 102 is not rectilinear because the interior angles B formed between walls 106, 114 and between walls 110, 112 are less than 90 degrees. This is accomplished by slanting the interior surfaces 130, 132 of top walls 112, 114 inwardly toward the center of retaining portion 102. Exterior portions of surface S, the surfaces 134, 136 of top walls 112, 114, may remain coplanar. The shoulders 120, 122 of the gasket 100 remain parallel to walls 112, 114 so that they are likewise inclined downwardly and inwardly toward the center of retaining portion 102. The retaining portion 102, like retaining portion 22 of FIG. 4, is larger in volume than anchoring portion 124 of gasket 100, to allow for expansion of gasket 100. Otherwise, the embodiment of FIG. 5 is substantially the same as the embodiment of FIG. 4.

The invention provides a more reliable gasket or sealing assembly for use with internal combustion engines. It optimizes retention of the gasket to the engine part, maximizes stability of the gasket, and minimizes the potential of buckling of the seal and potentially eliminates gasket disengagement during engine assembly. It is easier to install than prior art seals and requires no auxiliary adhesive means. In use, exposure of the sealing assembly to engine fluids like coolant, oil and fuel will not cause the gasket to split and break; rather, the natural expansion of the elastomer actually encourages gasket retention. This gasket assembly will reduce the need for engine assembly rework and maintenance which can promote longer engine part life.

From the foregoing it will be apparent to those skilled in the art that modifications may be made without departing from the spirit and scope of the present invention. Accordingly, the invention is not intended to be limited except as may be made necessary by the appended claims.

What is claimed is:

1. A sealing assembly for use in an internal combustion engine comprising:

an engine part defining an undercut groove and having a thin, expansive elastomeric gasket retained in said groove, said undercut groove having a retaining portion and a reduced channel opening at a surface of said engine part, said retaining portion having a bottom wall, two side walls and top wall portions, said top wall portions also defining said reduced channel, said gasket comprising an anchoring portion and a sealing portion integral therewith and extending outwardly beyond said engine part surface, said anchoring portion being disposed in said retaining portion of said groove so as to contact said bottom wall and said top wall portions, and said retaining portion defining a volume which is at least 5% greater than the volume of said anchoring portion before exposure of said gasket to an engine fluid.

2. The sealing assembly of claim 1 wherein said gasket anchoring portion has a pair of shoulders, each shoulder opposing a top wall portion of said retaining portion.

3. The sealing assembly of claim 2 wherein said top wall portions each have an interior surface and an exterior surface, said interior surface being non-parallel to said exterior surface.

4. The sealing assembly of claim 1 wherein said retaining portion is at least 10% larger in volume than said anchoring portion.

5. A sealing assembly for use with an internal combustion engine, comprising:

a gasket comprised of elastomeric material, said gasket having a sealing portion, neck portion, and an anchoring portion of selected volume, said anchoring portion having a pair of shoulders and a bottom portion opposite the shoulders; and an engine part defining a groove for receiving said anchoring portion, said groove formed by a plurality of walls, two of said walls spaced from each other by said neck portion of said gasket and opposing said shoulders, a bottom wall opposing said bottom portion of the anchoring portion, said groove being sufficiently larger in volume than said anchoring portion before exposure of said gasket to an engine fluid so that upon an exposure to engine fluid, said anchoring portion expands.

6. The sealing assembly of claim 5 wherein said sealing portion of said gasket includes at least one lip extending outside of said groove and laterally along said engine part.

7. The sealing assembly of claim 5 wherein said groove includes a retaining portion defined by said plurality of walls and a reduced channel between said spaced walls and through which said neck portion of said gasket passes.

8. The sealing assembly of claim 7 wherein said retaining portion of said groove defines a volume which is at least 5% greater than the volume of said anchoring portion at the time of assembly.

9. The sealing assembly of claim 7 wherein said neck portion of said gasket substantially fills said reduced channel.

10. The sealing assembly of claim 1 wherein a portion of said gasket substantially fills said reduced channel.

11. The sealing assembly of claim 1 wherein the at least 5% greater volume of said anchoring portion defines an empty space between at least one side wall of said retaining portion and said anchoring portion.

12. The sealing assembly of claim 5 wherein said plurality of walls includes at least one side wall and wherein said larger volume of said grooves defines an empty space between said at least one side wall and said anchoring portion.

* * * * *